Feb. 19, 1929.

W. H. ANDERSON 1,702,290

AUTOMATIC AUTO SIGNAL

Filed July 20, 1927 2 Sheets-Sheet 1

Wm. H. Anderson Inventor

By C. A. Snow & Co.

Attorneys

Feb. 19, 1929. 1,702,290
W. H. ANDERSON
AUTOMATIC AUTO SIGNAL
Filed July 20, 1927  2 Sheets-Sheet 2

Wm. H. Anderson, Inventor

By C. A. Snow & Co.
Attorneys

Patented Feb. 19, 1929.

1,702,290

UNITED STATES PATENT OFFICE.

WILLIAM H. ANDERSON, OF SPOKANE, WASHINGTON.

AUTOMATIC AUTO SIGNAL.

Application filed July 20, 1927. Serial No. 207,188.

This invention relates to a signaling device especially designed for use on motor vehicles and aims to provide novel means whereby the operator of a vehicle may signal to approaching automobiles the intended movements of the machine, thereby facilitating the driving of motor vehicles in traffic.

Another object of the invention is to provide a device of this character wherein the signaling arm is in the form of a hollow hand, novel means being provided for illuminating the hand so that the same may be readily seen by persons in approaching automobiles.

A still further object of the invention is to provide means for simultaneously lighting the lamp in the hand portion of the signaling arm with the movements of the arm to its indicating positions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
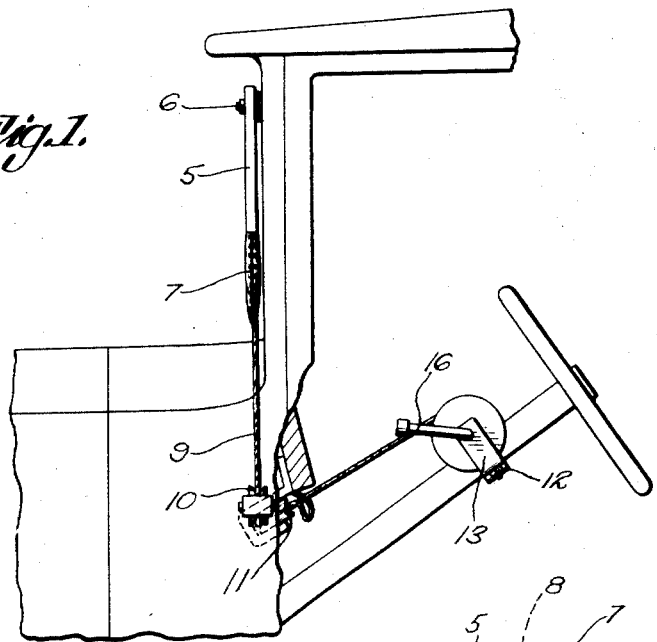
Figure 1 is an elevational view illustrating a portion of a motor vehicle and illustrating a signaling device as installed thereon.

Referring to the drawings in detail, the reference character 5 designates the indicating arm which may be pivotally connected to the body of the motor vehicle as by means of the bolt 6.

The arm 5 is hollow and is supplied with a hand portion 7 also hollow, the hand portion being provided with a plurality of openings outlining the hand so that light rays projected from the lamp 8 may outline the hand making the same clearly visible in the dark.

The operating cable which is indicated at 9 is in the form of a heavy electric wire, and as shown extends through the arm 5 and connects with the lamp 8 in the usual and well known manner. The member 9 passes over pulleys 10 and 11 which may be conveniently located adjacent to the instrument board and in a manner as suggested by Figure 2 so that when the cable is pulled, it will be guided to efficiently accomplish its purpose.

Positioned on the steering column is a bracket 12 that has upstanding end portions 13 formed with openings to receive the shafts 14 and 15, each shaft being provided with a right angled extremity 16 defining handles to be grasped by the operator to manipulate the device.

At the central portion of the bracket 13 is a curved portion 17 adapted to clamp around the steering column and as shown, this curved portion cooperates with the curved clamping member 18, the same being held to the bracket 12 by means of the bolts 19.

Supported between the upstanding end portions 13 is a tubular member 20 in which the shafts 14 and 15 operate, the shaft 14 being supplied with a pin 21 that moves in an elongated opening 22 of the member 20, the pin 21 being designed to contact with the shoulders or ends of the elongated cut out portion 22 to move the tubular member, for purposes to be hereinafter more fully described.

The shaft 15 is secured to the tubular member 20 by means of the pin 23 that extends therethrough, to the end that when the shaft 15 is rotated, the drum to be hereinafter more fully described will be rotated. A coiled spring 24 is arranged in a manner to normally set up a rotary action between the pin 23 and plate 25 to return the member 20 to its inoperative position.

Figure 4:
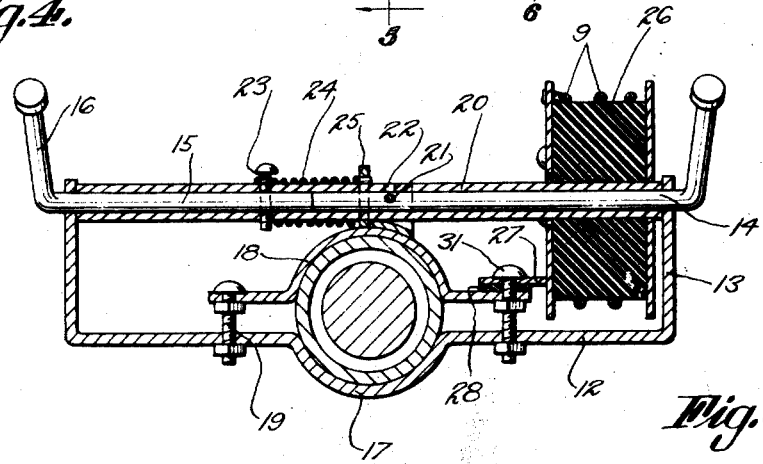
Figure 4 is a sectional view through the operating device.
Figure 5:
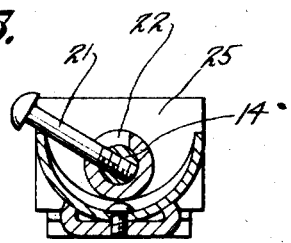
Figure 5 is a sectional view taken on line 5—5 of Figure 3.
Figure 6:
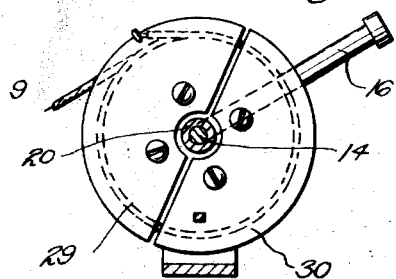
Figure 6 is a sectional view taken on line 6—6 of Figure 3.

Secured to the tubular member 20 is the pulley 26 which is insulated from the tubular member 20 as clearly shown by Figure 4 of the drawings. One end of the member 18 is supplied with a finger 27 which is insulated therefrom, by means of the insulation 28. As shown, one end of the drum 20 is formed in the sections 29 and 30 respectively, the section 29 being provided with an opening to receive one end of the cable or wire 9 in such a way that electric energy passing through the section 29 may pass through the wire 9 to the lamp 8.

An electric wire which is in circuit with a suitable source of electric supply is connected to the bolt 31, the circuit being grounded to the frame in the usual manner.

Figure 2:
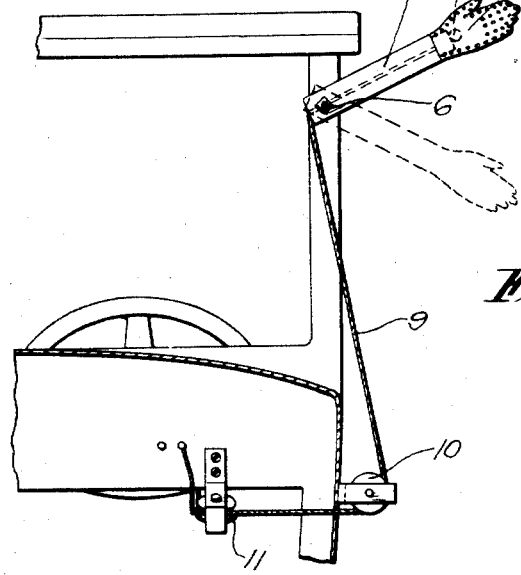
Figure 2 is a front elevational view thereof.
Figure 3:
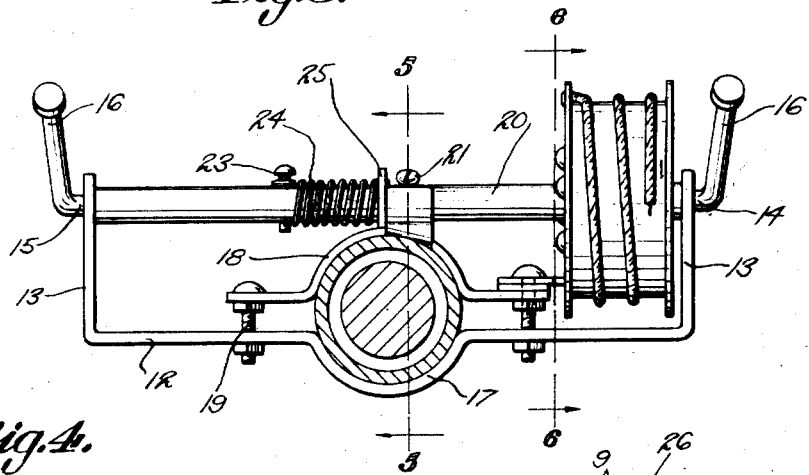
Figure 3 is an enlarged elevational view of the operating mechanism.

It will thus be seen that due to this construction, should it be desired to rotate the drum to wind the wire 9 on the drum, to move the indicating arm to a position as shown in dotted lines in Figure 2 of the drawings, it is only necessary to rotate the shaft 14, causing the drum to move to a certain position which will bring the arm 5 to an inclined position as shown in dotted lines.

Should it be desired to turn to the left, the shaft 15 is operated, which further winds the wire on the drum moving the arm to an elevated position as shown in full lines in Figure 2.

It is of course obvious that with this movement of the arm, the finger 27 moves over that portion of the drum which is in circuit with the wire 29, causing electric energy to pass to the wire to illuminate the lamp 8.

I claim:

An actuating device for direction indicators, including a bracket, a tubular member mounted within the bracket, shafts extending into the tubular member, said tubular member having an elongated opening, a pin extending through the tubular member and one of the shafts, a pin extending through the elongated opening and secured to the other shaft, a coiled spring connected with one of the pins, means for anchoring the opposite end of the spring, handles on the outer ends of the shafts to operate the shafts, a pulley on the tubular member to rotate therewith, and a wire wound on the pulley and connected with the indicator to operate the indicator.

In testimony that I claim the foregoing as my own, I have hereto affixed my signature.

WILLIAM H. ANDERSON.